(12) United States Patent
Lee

(10) Patent No.: US 11,095,591 B2
(45) Date of Patent: Aug. 17, 2021

(54) METHOD OF CONTROLLING TERMINAL DEVICE, TERMINAL DEVICE, AND NON-TRANSITORY COMPUTER READABLE MEDIUM STORING PROGRAM FOR EXECUTING THE METHOD

(71) Applicant: LINE Corporation, Tokyo (JP)

(72) Inventor: Sunghyun Lee, Tokyo (JP)

(73) Assignee: LINE CORPORATION, Tokyo (JP)

( * ) Notice: Subject to any disclaimer, the term of this patent is extended or adjusted under 35 U.S.C. 154(b) by 309 days.

(21) Appl. No.: 16/139,222

(22) Filed: Sep. 24, 2018

(65) Prior Publication Data

US 2019/0028417 A1    Jan. 24, 2019

Related U.S. Application Data

(63) Continuation of application No. PCT/JP2016/089219, filed on Dec. 29, 2016.

(30) Foreign Application Priority Data

Mar. 24, 2016  (JP) .............................. JP2016-060289

(51) Int. Cl.
*H04L 12/58* (2006.01)
*G06F 13/00* (2006.01)
(Continued)

(52) U.S. Cl.
CPC ............ *H04L 51/16* (2013.01); *G06F 3/0485* (2013.01); *G06F 13/00* (2013.01); *H04L 51/066* (2013.01);
(Continued)

(58) Field of Classification Search
CPC ....... H04L 51/16; H04L 67/025; H04L 67/22; H04L 51/30; H04L 51/066; G06F 3/0485; G06F 13/00; H04M 1/72552
See application file for complete search history.

(56) References Cited

U.S. PATENT DOCUMENTS 8,139,573 B2 *  3/2012  Kim ....................... H04W 4/12
                                                     370/389
9,306,893 B2 *  4/2016  Sharp ...................... H04L 51/22
(Continued)

FOREIGN PATENT DOCUMENTS

CN         1983242 A     6/2007
CN       101393717 A     3/2009
(Continued)

OTHER PUBLICATIONS

Japanese Office Action dated Jun. 9, 2020 issued in corresponding Japanese Patent Application No. 2016-060289. English translation has been provided.
(Continued)

*Primary Examiner* — Philip J Chea
*Assistant Examiner* — Mohammed Ahmed
(74) *Attorney, Agent, or Firm* — Harness, Dickey & Pierce, P.L.C.

(57) ABSTRACT

A method of controlling a terminal device including receiving a message transmitted from a terminal device, storing the message received in association with identification information and state information of the message in a storage, displaying messages from various terminal devices together with state information thereof on a display, the messages including the first message, accepting an input for the display from a user, determining whether or not an entirety of the message is displayed on the display as a result of a display transition, updating the state information of the message as a read state indicating the message has been read in response to the determining indicating that the entirety of the message is displayed on the display, and transmitting the message, the updated identification information of the message, and the updated state information associated with the message to the terminal device may be provided.

12 Claims, 11 Drawing Sheets

(51) Int. Cl.
  *G06F 3/0485*    (2013.01)
  *H04L 29/08*     (2006.01)
  *H04M 1/72436*   (2021.01)

(52) U.S. Cl.
  CPC ............ *H04L 51/30* (2013.01); *H04L 67/025* (2013.01); *H04L 67/22* (2013.01); *H04M 1/72436* (2021.01); *H04M 2250/22* (2013.01)

(56) References Cited

U.S. PATENT DOCUMENTS

| | | | |
|---|---|---|---|
| 2007/0005713 A1* | 1/2007 | LeVasseur | H04L 51/18 709/206 |
| 2007/0135930 A1* | 6/2007 | Kirihara | G06F 3/1273 700/1 |
| 2009/0083658 A1* | 3/2009 | Ito | H04M 1/72552 715/781 |
| 2010/0107088 A1* | 4/2010 | Hunt | H04L 67/10 715/752 |
| 2010/0217808 A1* | 8/2010 | Benninger | H04L 51/04 709/206 |
| 2011/0214088 A1* | 9/2011 | Sandru | G09G 5/346 715/785 |
| 2013/0007138 A1* | 1/2013 | Lin | H04L 12/6418 709/206 |
| 2014/0259189 A1* | 9/2014 | Ramachandran | H04W 4/21 726/30 |
| 2014/0289644 A1* | 9/2014 | Clarke | H04W 4/12 715/752 |
| 2015/0188870 A1* | 7/2015 | Sharp | H04L 51/22 715/752 |
| 2016/0026367 A1* | 1/2016 | Brown | G06F 3/04842 715/835 |
| 2016/0036736 A1* | 2/2016 | Tysowski | H04L 51/16 709/206 |
| 2017/0111308 A1* | 4/2017 | Kim | H04L 51/34 |
| 2019/0028417 A1* | 1/2019 | Lee | H04L 67/025 |

FOREIGN PATENT DOCUMENTS

| | | |
|---|---|---|
| JP | 2007-166176 A | 6/2007 |
| JP | 2009-075844 A | 4/2009 |
| JP | 2013-541777 A | 11/2013 |
| JP | 2014-115716 A | 6/2014 |

OTHER PUBLICATIONS

International Search Report dated Mar. 7, 2017 issued in International Application No. PCT/JP2016/089219.

Sugita, et al. "Analysis about user attention area using web browser operation log," Dai 4 Kai Forum on Data Engineering and the Database Society of Japan [online], Internet: <URL:http//db-event.jpn.org/deim2012/proceedings/final-pdf/b3-6.pdf> (2012). (English translation provided).

* cited by examiner

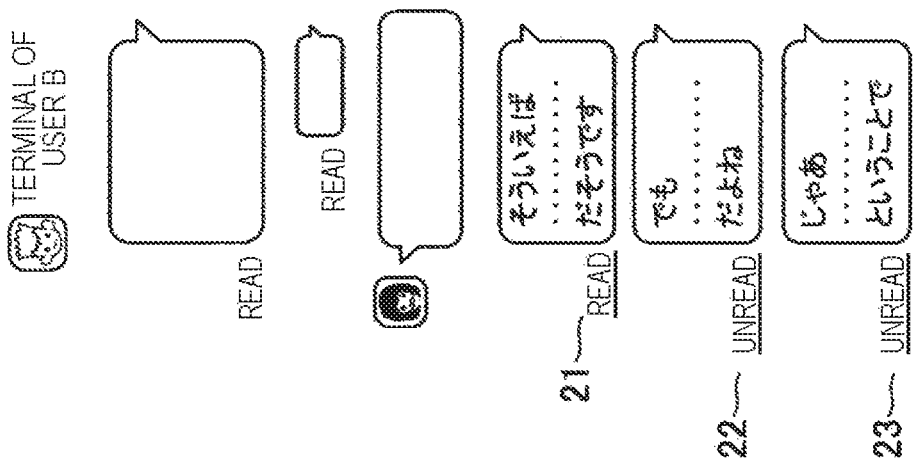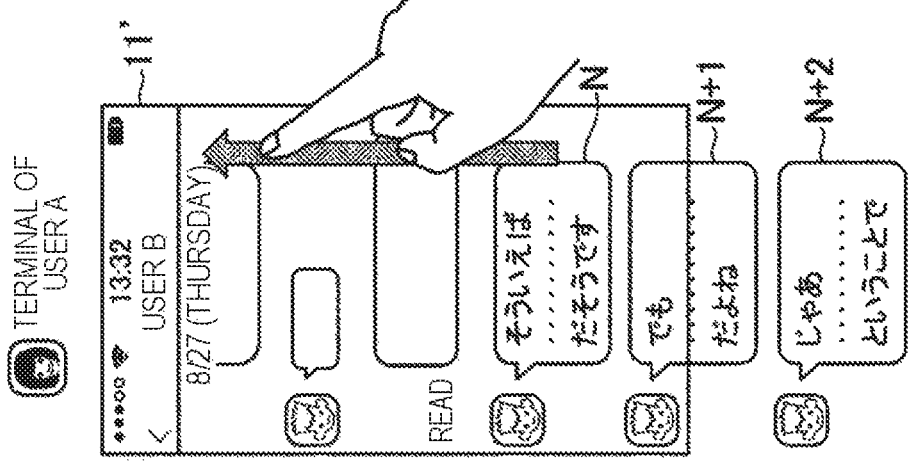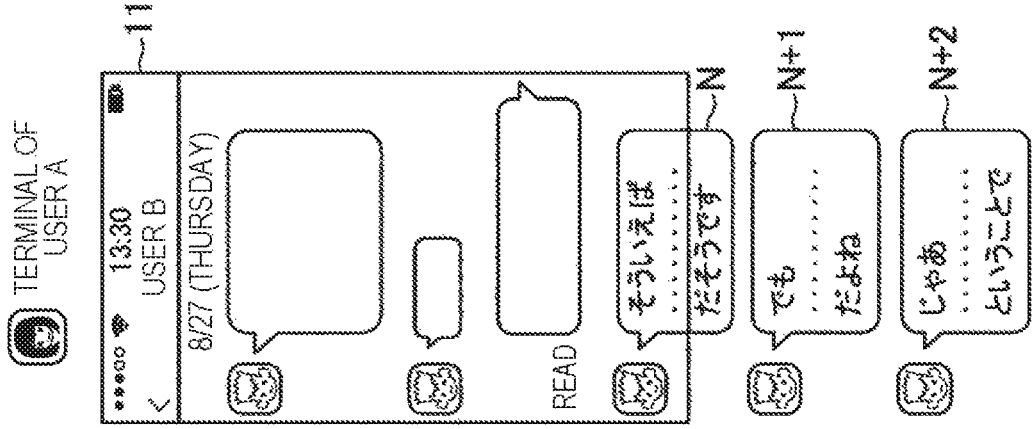

FIG. 5A

TALK ROOM ID = tr_1001 (USER A)

| CHRONOLOGICAL ORDER NUMBER | MESSAGE ID | TRANSMISSION USER | MESSAGE HEAD DISPLAY | STATE INFORMATION | ... |
|---|---|---|---|---|---|
| ... | ... | ... | ... | ... | ... |
| N-3 | m00001 | User_B | 1 | READ | ... |
| N-2 | m00002 | User_B | 1 | READ | ... |
| N-1 | m00003 | User_A | 1 | READ | ... |
| N | m00004 | User_B | 1 | UNREAD | ... |
| N+1 | m00005 | User_B | 0 | UNREAD | ... |
| N+2 | m00006 | User_B | 0 | UNREAD | ... |
| ... | ... | ... | ... | ... | ... |

FIG. 5B

TALK ROOM ID = tr_1001 (USER A)

| CHRONOLOGICAL ORDER NUMBER | MESSAGE ID | TRANSMISSION SERVER | MESSAGE HEAD DISPLAY | STATE INFORMATION | ... |
|---|---|---|---|---|---|
| ... | ... | ... | ... | ... | ... |
| N-3 | m00001 | User_B | 1 | READ | ... |
| N-2 | m00002 | User_B | 1 | READ | ... |
| N-1 | m00003 | User_A | 1 | READ | ... |
| N | m00004 | User_B | 1 | READ | ... |
| N+1 | m00005 | User_B | 1 | UNREAD | ... |
| N+2 | m00006 | User_B | 0 | UNREAD | ... |
| ... | ... | ... | ... | ... | ... |

METHOD OF CONTROLLING TERMINAL DEVICE, TERMINAL DEVICE, AND NON-TRANSITORY COMPUTER READABLE MEDIUM STORING PROGRAM FOR EXECUTING THE METHOD

CROSS-REFERENCE TO RELATED APPLICATION(S)

This U.S. non-provisional application is a continuation of, and claims the benefit of priority under 35 U.S.C. § 365(c) from International Patent Application No. PCT/JP2016/089219, filed on Dec. 29, 2016, in the World Intellectual Property Organization (WIPO), which designates the United States of America and claims priority to Japanese Patent Application No. 2016-060289, filed on Mar. 24, 2016, the entire contents of each of which are incorporated herein by reference.

BACKGROUND

Field

The present inventive concepts relate to a method of controlling a terminal device, a terminal device, and/or a non-transitory computer readable recording medium storing a program that, when executed by a processor, causes the processor to exchange messages between user terminals.

Description of Related Art

There are many services (e.g., messaging services) available for exchanging messages between user terminals through a network, for so-called chatting. In such messaging services, a plurality or a pair of users using the service can exchange messages in real time.

SUMMARY

According to an example embodiment of the present inventive concepts, a method of controlling a terminal device includes receiving a first message transmitted from a first terminal device, storing the first message received in association with first identification information and first state information of the first message in a storage, displaying messages from a plurality of terminal devices and stored in the storage together with respective state information of the messages from various ones of the plurality of terminal devices on a display, the messages including the first message, the respective state information including the first state information, accepting an input operation for the display from a user, determining whether or not an entirety of the first message is displayed on the display as a result of a display transition on the display according to the input operation, updating the first state information of the first message as a read state indicating a state in which the first message has been read in response to the determining indicating that the entirety of the first message is displayed on the display, and transmitting the first message, the first identification information of the first message of which the first state information has been updated, and the first state information associated with the first message to the first terminal device.

According to some example embodiments of the present inventive concepts, the transmitting may be performed at a timing at which the display transition of the display according to the input operation from the user is stopped.

According to some example embodiments of the present inventive concepts, the transmitting may be performed at a timing at which the first state information of the first message is updated to a read state in the updating.

According to some example embodiments of the present inventive concepts, the transmitting may be performed in response to the input operation for the display being stopped.

According to some example embodiments of the present inventive concepts, the displaying may display the messages on the display in chronological order, the determining may determine that an entirety of the first message has been displayed on the display as an N-th message in response to a text end of the N-th message displayed on the display as a result of the display transition of the display according to the input operation, and the updating may update the first state information of the first message as the N-th message to the read state in response to a result of the determining indicating that the text end of the N-th message is displayed on the display.

According to some example embodiments of the present inventive concepts, the displaying may display the messages on the display in chronological order, the determining may determine that an entirety of the first message has been displayed on the display as an N-th message in response to at least a part of an (N+1)-th message, from among the messages, displayed on the display as a result of the display transition of the display according to the input operation, and the updating may update the first state information of the first message as the N-th message to the read state in response to a result of the determining indicating that at least a part of the (N+1)-th message displayed on the display.

According to some example embodiments of the present inventive concepts, the updating may update the first state information of the first message as the N-th message to the read state in response to at least a part of the (N+1)-th message being displayed after at least a part of the N-th message is displayed for a time.

According to some example embodiments of the present inventive concepts, the updating may update the state information of the N-th message to the read state in response to a text end of the N-th message is displayed after at least a part of the N-th message is displayed for a time.

According to an example embodiment of the present inventive concepts, a terminal device includes a memory configured to store computer-readable instructions, and one or more processors coupled to the memory. The one or more processor may be configured to execute the computer-readable instructions such that the one or more processors are configured to receive a first message transmitted from a first terminal device, store the received first message in association with first identification information and first state information of the first message in a storage, display messages from a plurality of terminal devices and stored in the storage together with respective state information of the messages on a display, the messages including the first message, the respective state information including the first state information, accept an input operation for the display from a user, determine whether or not an entirety of each of the first message is displayed on the display as a result of a display transition on the display according to the input operation, update the first state information of the first message as a read state indicating a state in which the first message has been read in response to the determining indicating that the entirety of the first message is displayed on the display, and transmit the first identification information of the first message of which the first state information has been updated, the first state information associated with the first message, and the first message to the first terminal device, According to an example embodiment of the present inventive concepts, there is provided a non-transitory computer readable recording medium storing a program that, when executed by a processor, causes the processor to perform a method. The method may include receiving a first message transmitted from a first terminal device, storing the received first message in association with first identification information and first state information of the first message in a storage, displaying messages from a plurality of terminal devices and stored in the storage together with respective state information of the messages on a display, the messages including the first message, the respective state information including the first state information, accepting an input operation for the display from a user, determining whether or not an entirety of the first message is displayed on the display as a result of a display transition on the display according to the input operation, updating the first state information of the first message as a read state indicating a state in which the first message has been read in response to the determining indicating that the entirety of the first message is displayed on the display, and transmitting the first identification information of the first message of which the first state information has been updated, the first state information associated with the first message, and the first message to the first terminal device.

According to the present inventive concepts, as a result of a transition of a display displaying a message, whether or not all the messages are displayed on the display is determined. Thus, a method of controlling a terminal device, a terminal device, and non-transitory computer readable medium storing a program, when executed by a processor, configures the processor to determine whether or not each received message has been read by a user can be provided. Thus, user convenience is improved.

BRIEF DESCRIPTION OF THE DRAWINGS

FIGS. 4A, 4B, and 4C are schematic diagrams illustrating one example embodiment of the present inventive concepts.

FIGS. 5A and 5B are examples of state information stored in a storage.

DETAILED DESCRIPTION

In a case in which the inventive concepts described in this specification are executed, it should be noted that observation of legal terms relating to the confidentiality of communication is necessary.

Figure 9A:
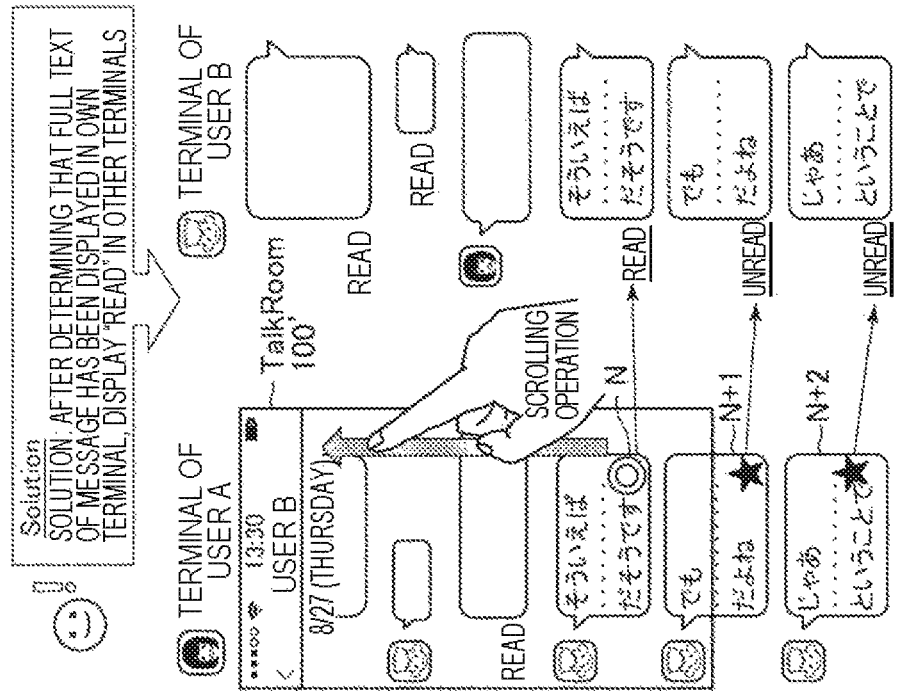
FIGS. 9A and 9B are schematic diagrams illustrating an overview of the present inventive concepts.
Figure 9B:
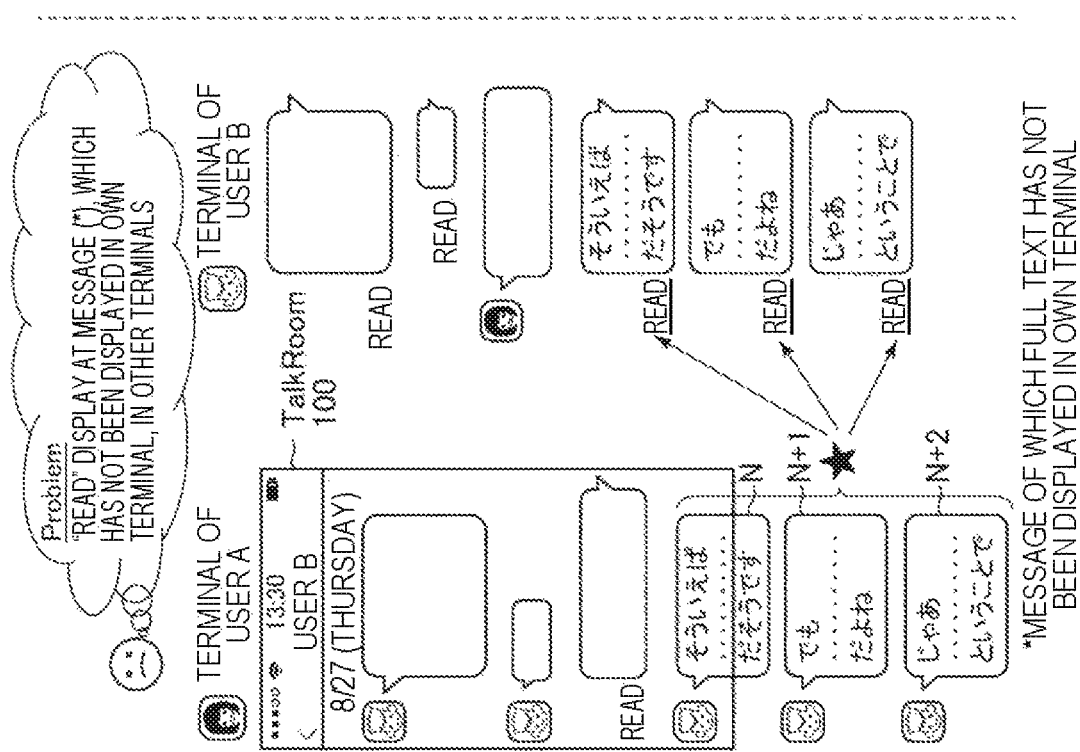

Hereinafter, some example embodiment of the present inventive concepts will be described with reference to the drawings. First, an overview of the present inventive concepts will be described with reference to FIGS. 9A and 9B. FIG. 9A is a schematic diagram illustrating a conventional messaging service, and FIG. 9B is a schematic diagram illustrating a messaging service according to one example embodiment of the present inventive concepts. In FIG. 9A, a user A and a user B exchange messages, and a display screen (hereinafter referred to as a "talk room screen") TalkRoom 100 displays exchange of messages between the user A and the user B in chronological order on a display of a terminal device of the user A. Here, a state is formed in which each of messages N, N+1, and N+2, among messages transmitted from the user B to the user A, is not entirely displayed on the display of the terminal device of the user A.

However, in a conventional messaging service, in the terminal device of the user A, the messages N, N+1, and N+2 each of which has not been entirely displayed on the display are also determined as having been read by the user A on a display of a terminal device of the user B, as illustrated in FIG. 9A, and read information indicating a state in which the messages N, N+1, and N+2 have been read by the user A is transmitted to the user B through a server. Then, in the terminal device of the user B, "read" is displayed in the messages transmitted by the user B to the user A.

As described above, in a conventional messaging service, a "read" mark is displayed on a message transmitted by the user B to the user A on a talk room screen with the user A and displayed in the terminal device of the user B, even when the message has not been read by the user A.

Accordingly, the user B cannot accurately check whether or not a message that he or she has transmitted has been read by the user A, which is inconvenient. In addition, since a message that has not been read by the user A is presented as "read" to the user B, the user A feels that he or she has to check all the messages when the talk room screen is open, which is burdensome.

In contrast to this, an overview of a messaging service according to one example embodiment of the present inventive concepts will be described with reference to FIG. 9B. According to one example embodiment of the present inventive concepts, as illustrated in FIG. 9B, in a talk room screen TalkRoom 100' displayed in a terminal device of a user A, only a message N of which an entirety of the message has been displayed on the talk room screen TalkRoom 100' in accordance with a scrolling operation or the like of the user A is determined as having been read by the user A. Then, read information indicating a state in which the message N has been read by the user A is transmitted to a user B through a server. Then, in a terminal device of the user B, "read" is displayed on the message N transmitted by the user B. Unlike a conventional messaging service, for messages N+1 and N+2 of which an entirety of each of the messages have not been displayed on the talk room screen TalkRoom 100', "unread" indicating a state in which the messages have not been read by the user A is displayed in the terminal device of the user B. Thus, according to the present inventive concepts, the user B can accurately check whether or not a message that he or she has transmitted has been read by the user A, which is convenient. In addition, a message that has not been read by the user A is not presented as "read" to the user B. Thus, the user A may easily select to check the message later by displaying the talk room screen. Thus, there is an advantage of a high degree of freedom. The overview of the present inventive concepts has been described above.

Figure 1:
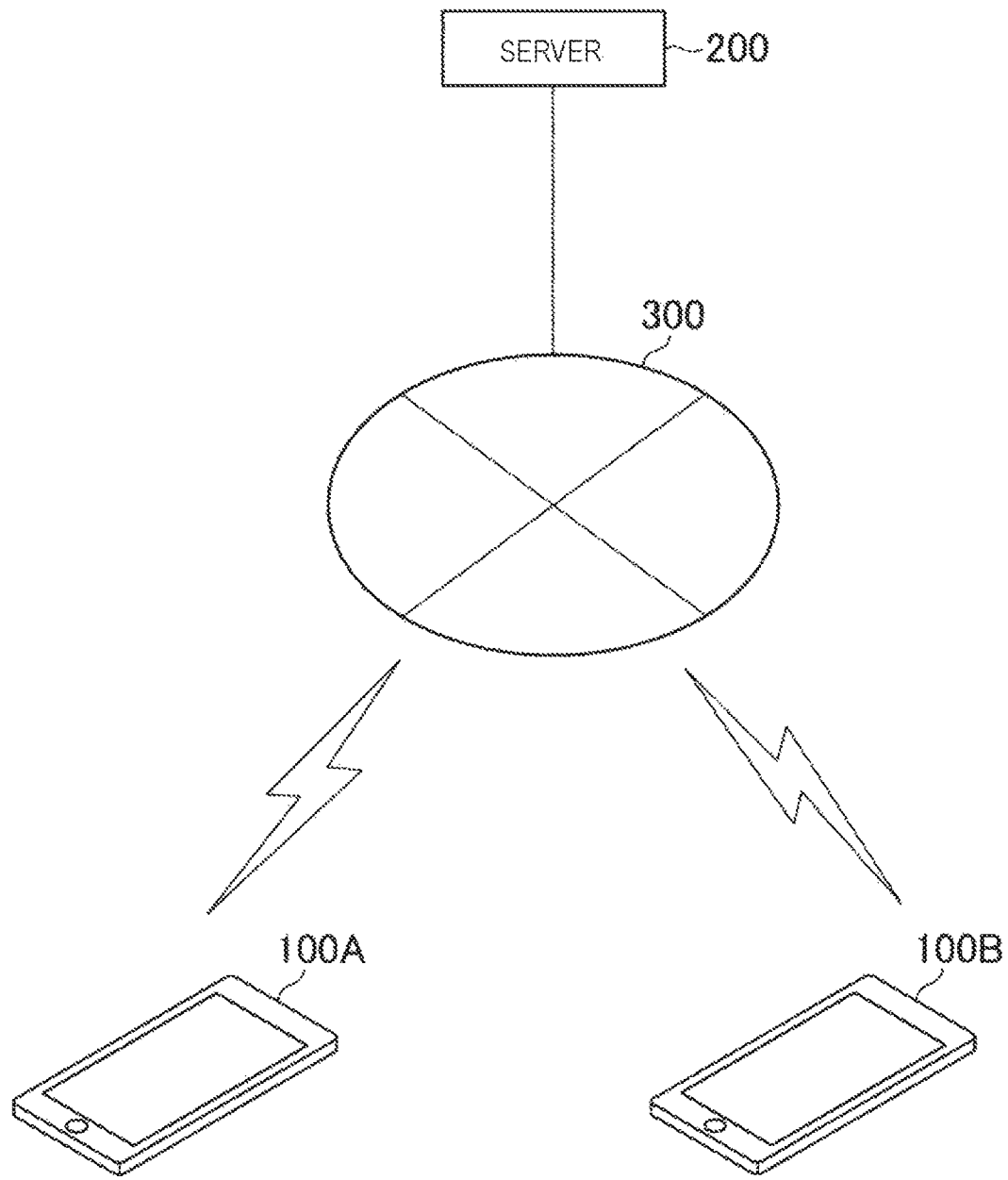
FIG. 1 is a schematic diagram of the configuration of a service system according to one example embodiment of the present inventive concepts.

FIG. 1 is a schematic diagram of the configuration of a service system according to one example embodiment of the present inventive concepts. As illustrated in FIG. 1, the service system 400 includes a server 200, terminal devices 100A and 100B, and a network 300. The server 200 is connected to the terminal devices 100A and 100B through the network 300. Although only two terminal devices are illustrated in FIG. 1 for the simplification of description, it is apparent that more terminal devices may be present.

The terminal devices 100A and 100B are communication terminals that are represented by smartphones or the like. The terminal devices 100A and 100B perform exchange of messages that is a part of a service according to one example embodiment of the present inventive concepts using a message application provided on a service side (hereinafter abbreviated as a "message application). Hereinafter, a case in which a user using the terminal device 100A (referred to as a user A) and a user using the terminal device 100B (referred to as a user B) perform exchange of messages will be described.

The server 200 is configured to relay communication between terminals. The server 200 receives a message transmitted by the terminal device 100A to the terminal device 100B through the network 300 and transmits the message to the terminal device 100B. The server 200 also receives a message transmitted by the terminal device 100B to the terminal device 100A through the network 300 and transmits the message to the terminal device 100A. Furthermore, the server 200 receives information relating to details of an operation instruction input by the user using an input unit 160 of each of the terminal devices 100A and 100B and performs a process according to the details of the instruction.

Figure 2:
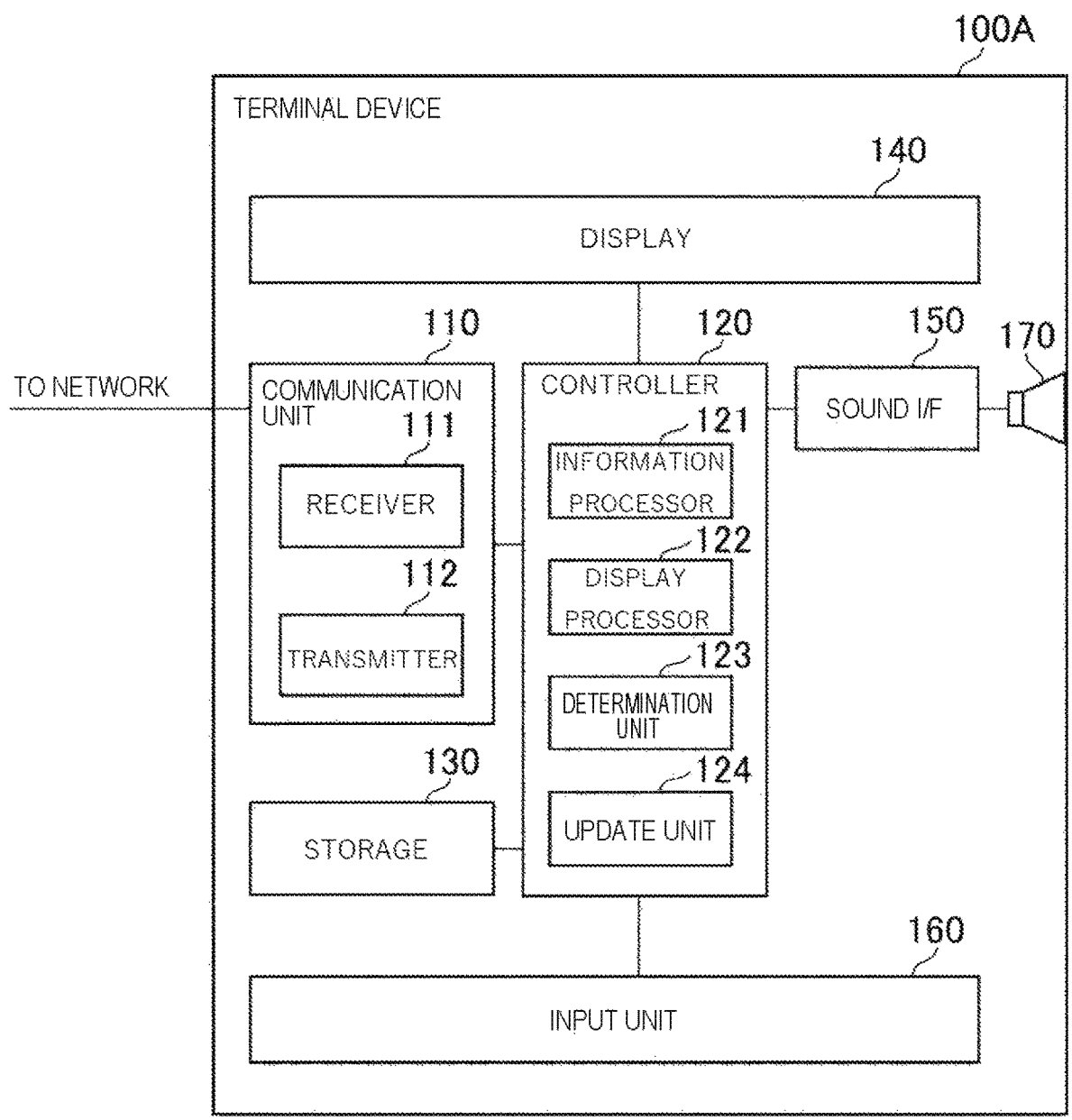
FIG. 2 is a block diagram of a terminal device according to one example embodiment of the present inventive concepts.

FIG. 2 is a block diagram of the terminal device 100A according to one example embodiment of the present inventive concepts. While the terminal device 100A will be described, the description similarly applies to the terminal device 100B. As illustrated in FIG. 2, the terminal device 100A includes a communication unit 110, a controller 120, a storage 130, a display 140, a sound interface (I/F) 150, an input unit 160, and a speaker 170. Here, the functions of these units will be briefly described, and details thereof will be described later.

The communication unit 110 includes a receiver 111 and a transmitter 112 and has a function of executing communication with the server 200 through the network 300. The communication may be executed either in a wired manner or in a wireless manner, and any communication protocol may be used as long as mutual communication can be executed. The receiver 111 receives a message transmitted from another terminal device 100B. Here, the message is not limited to a text message, and an image, a sound, a moving image, a stamp (digital sticker), and the like are included therein.

In addition, the receiver 111 receives state information of a message, which has been transmitted from a user using the terminal device 100A to another terminal device 100B, in the other terminal device 100B from the other terminal device 100B. Here, the "state information" is information representing whether or not a message received by the terminal device 100A or 100B is displayed on the display 140 thereof. The "state information" representing a "read" state represents a state in which the whole message is displayed on the display 140, and reading of the message has been completed by the user using the terminal device 100A or 100B. On the other hand, the "state information" representing an "unread" state represents that the whole message has not been displayed on the display 140, and the message has not been read by the user using the terminal device 100A or 100B.

In addition, "an entirety of the message being displayed on the display" means that the full text of the message is displayed on the display 140. Even in a case in which text of a message is long, and the full text of the message is not displayed on the display 140 at the same time, when the start to the end of the text of the message has been displayed on the display 140 by transitioning the display, a state in which "an entirety of the message has been displayed on the display" is determined. On the other hand, a state in which only a part such as the start of text of a message is displayed on the display 140 is an "unread" state.

The storage 130 has a function of storing various programs and various kinds of data that are necessary for operating the terminal device 100A. For example, in the storage 130, information such as a program of a message application used for receiving a service according to this example embodiment and the like is included. The storage 130 is typically embodied by various recording media such as a hard disk drive (HDD), a solid state drive (SSD), a flash memory, and the like. In addition, the storage 130, for example, is embodied by a random access memory (RAM) and includes a memory functioning as a work memory of the controller 120. The memory stores temporary data and the like. Various kinds of data stored in the storage 130 may be temporarily stored in the memory and then stored in the storage 130.

The storage 130 stores a message received by the receiver 111 in association with identification information and state information of the message. Here, the identification information of a message may be assigned to each message on a service providing side, and for example, may be an identification number composed of alphanumeric characters.

The controller 120 is a processor that has a function of controlling each unit of the terminal device 100A.

The controller 120 includes an information processor 121, a display processor (output unit) 122, a determination unit 123, and an update unit 124. The information processor 121 has a function of executing control such that information (a message or the like) is transmitted from the communication unit 110 to the server 200 on the basis of information input from the input unit 160. In addition, the information processor 121 also has a function of transmitting information received from the server 200 in the communication unit 110 to the display processor 122. The display processor 122 has a function of converting display data transmitted from the information processor 121 into pixel information and writing the converted pixel information into a frame buffer of the display 140. In other words, the display processor 122 outputs display information displaying a message stored in the storage 130 on the display 140.

The display 140 is a monitor having a function of displaying an image in accordance with display data written in the frame buffer by the display processor 122 and is typically embodied by a liquid crystal display. The display 140 displays a message application screen that is provided from the service side and is stored in the storage 130. In addition, the display 140 displays messages stored in the storage 130 in chronological order or displays a notification transmitted from the server 200 on the basis of display information output from the display processor 122.

The input unit 160 accepts an input from a user and transmits information relating to the input to the controller 120. In the terminal device 100A, the input unit 160 is embodied using a touch panel or the like, detects contact of a user's finger or an indicator such as a stylus and a contact position thereof, and transmits coordinates of the contact position to the information processor 121. In this example embodiment, the input unit 160 accepts an input operation from a user such as an operation of transitioning the display of the display 140 (for example, a scrolling operation), a user's input of a message, selection for a notification received from the server 200, or the like.

The determination unit 123 determines whether or not an entirety of the message is displayed on the display 140 as a result of transition of the display of the display 140 according to an input operation received from the input unit 160. The update unit 124 updates state information of a message of which an entirety of the message is determined to have been displayed on the display 140 with a read state indicating a state in which the reading of the message has been completed. In addition, the transmitter 112 transmits identification information of the message of which the state information has been updated by the update unit 124 and the updated state information to another terminal device 100B.

The sound I/F 150 may be an interface of the speaker 170 and/or may include an interface of an earphone not illustrated in the drawing.

The speaker 170 may be set to generate a notification sound in a case in which a notification is received from the server 200. In addition, the speaker 170 outputs a sound of a moving image in a case in which the moving image is transmitted as a message.

Although in FIG. 2, the terminal device 100A are illustrated to include various elements (e.g., the receiver 111, the transmitter 112, the information processor 121, the display processor, the determination unit 123, and the update unit 124), one or more processors may be configured to perform the functions of the various elements and used in place of the various elements.

Figure 3:
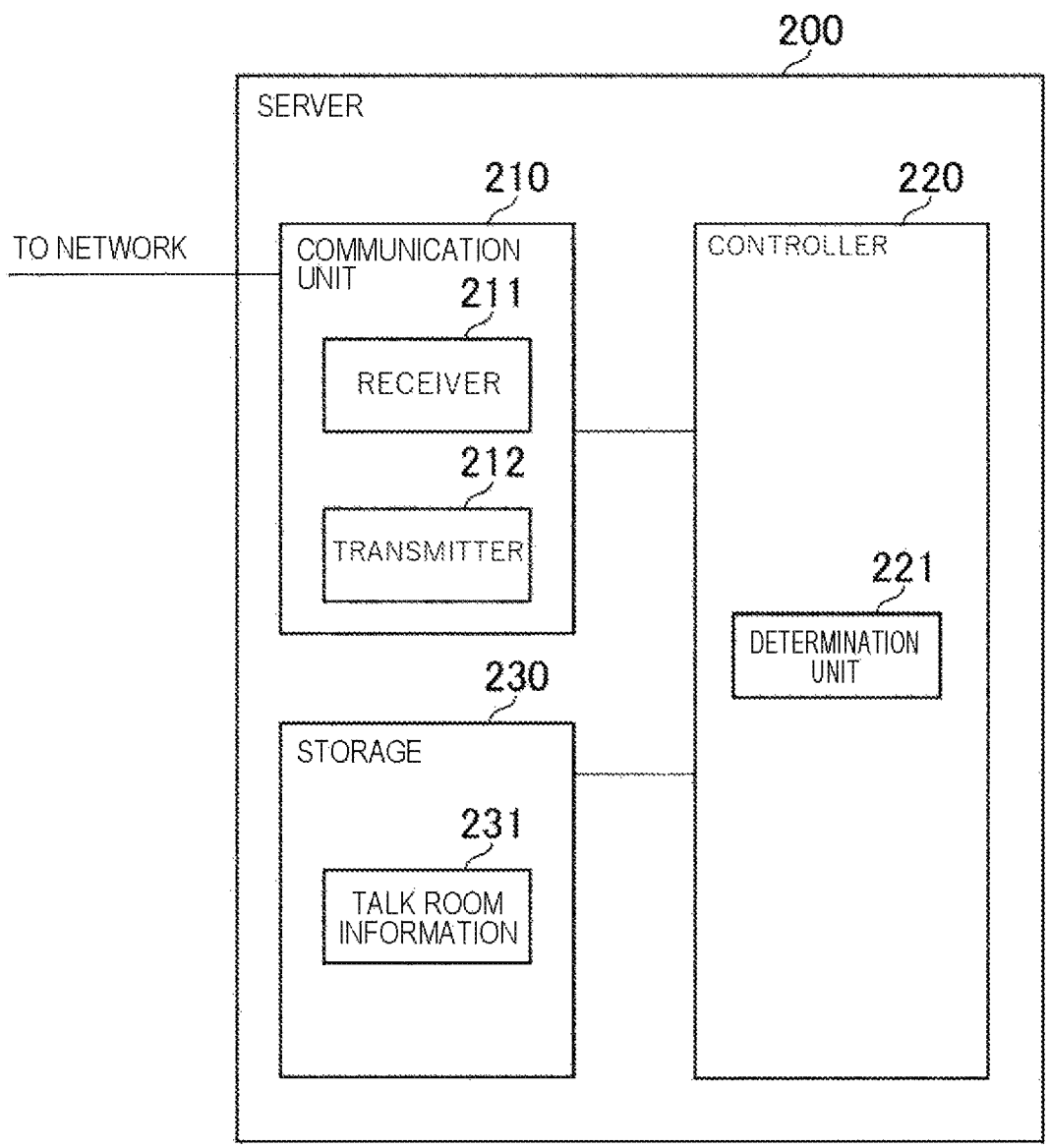
FIG. 3 is a block diagram of a server according to one example embodiment of the present inventive concepts.

FIG. 3 is a block diagram of the server 200 according to one example embodiment of the present inventive concepts. As illustrated in FIG. 3, the server 200 includes a communication unit 210, a controller 220, and a storage 230.

The communication unit 210 may include a receiver 211 and a transmitter 212 and execute communication (transmission/reception of various kinds of data and messages) with user's terminal devices 100A and 100B through the network 300 in accordance with an instruction from the controller 220. The communication may be performed either in a wired manner or in a wireless manner and may use any communication protocol as long as mutual communication can be executed. The receiver 211 receives a message having another user as a destination and state information associated with a message from the terminal device 100A of a user. The transmitter 112 transmits the received message to the terminal device 100B of another user. In addition, the transmitter 112 transmits the received state information to the terminal device that has transmitted the message associated with the state information.

The controller 220 is a processor that has a function of controlling each unit of the server 200. The controller 220 may include a determination unit 221. The determination unit 221 performs various determination processes. For example, the determination unit 221 determines a terminal device to which state information is to be transmitted on the basis of the identification information and state information of a message, which are transmitted by the terminal device, received by the receiver 211.

The storage 230 is typically embodied by various recording media such as an HDD, an SSD, a flash memory, and the like and has a function of storing various programs and various kinds of data that are desired for operating the server 200. The storage 230 may store information (e.g., talk room information 231) relating to a talk room in which messages are exchanged between users (talk room information). As the talk room information, identification information of a talk room, identification information of users participating in the talk room, identification information of messages exchanged in the talk room, message state information, and the like may be included. In addition, the storage 230, for example, may be embodied by a RAM and includes a memory functioning as a work memory of the controller 220. The memory stores temporary data. In addition, various kinds of data to be stored in the storage 230 may be temporarily stored in a memory and then stored in the storage 230.

Although in FIG. 3, the server 200 are illustrated to include various elements (e.g., the receiver 211, the transmitter 212, and the controller 220 including the determination unit 221), one or more processors may be configured to perform the functions of the various elements and used in place of the various elements.

First Example Embodiment

Next, determining whether or not an entirety of the received message has been displayed on the display 140 by the determination unit 123 of the terminal device 100A will be described in detail with reference to FIGS. 4A, 4B, and 4C and FIGS. 5A and 5B. In this first example embodiment of the present inventive concepts, in a case in which at least a part (for example, a text head) of the next message in chronological order has been displayed, it is determined that an entirety of the message has been displayed. FIG. 4A is a diagram illustrating a talk room screen 11 of a user A and a user B displayed on a display 140 of a terminal device 100A of the user A. FIG. 4A shows a state in which an entirety of the message of each of messages N, N+1, and N+2 received from the user B has not been displayed on the talk room screen 11. FIG. 4B is a diagram illustrating a talk room screen 11' in a state in which the display of the display 140 is transitioned from the state of FIG. 4A in accordance with an input operation from the user A (a scrolling operation of the screen) for the input unit 160. Thus, FIG. 4B shows a state in which an entirety of the message N is displayed, and at least a part (text head) of the message N+1 is displayed on the talk room screen 11'.

Here, FIGS. 5A and 5B are diagrams illustrating a talk room information tables stored in the storage 130 of the terminal device 100A of the user A. As illustrated in FIGS. 5A and 5B, in the talk room information table, a chronological order number, a message ID, a transmission user, display/non-display of a text head, state information, and the like may be stored for each talk room identifier (ID). Here, the chronological order represents the order in time assigned to a message, which is transmitted from each terminal device, in each terminal device. A transmission time of a message may be assigned by the terminal device or the server 200 or may be assigned by a combination of the terminal device and the server 200. Accordingly, when a message is transmitted, the terminal device may store time information in the terminal device in association with the message, and/or the server 200 can transmit time information relating to a time when the message is received by the server 200 to each terminal device in association with the message when relay of messages between terminal devices is executed.

FIG. 5A is a talk room information table 12 corresponding to the talk room screen 11 illustrated in FIG. 4A, and FIG. 5B is a talk room information table 12' corresponding to the talk room screen 11' illustrated in FIG. 4B. In FIGS. 5A and 5B, a chronological order number "N" is assumed to be in correspondence with a message N. In the talk room screen 11 illustrated in FIG. 4A, a text head of the message N is displayed on the display 140, and thus, in the talk room information table 12 illustrated in FIG. 5A, an item of a text head display representing that a text head display is set as "1" in a message having a message ID "m00004" corresponding to chronological order number N. Text heads of a message N+1 and subsequent messages are not displayed, and thus items of the text head display are set as "0."

In the case of a transition to the talk room screen 11' as illustrated in FIG. 4B from this state, the talk room information table is updated as the talk room information table 12' illustrated in FIG. 5B by the update unit 124. In the talk room screen 11', a text head of the message N+1 is displayed, and thus the item of the text head display in a message ID "m00005" corresponding to the message N+1 is updated to "1" by the update unit 124. As illustrated on the talk room screen 11', in a case in which a part of the message N+1 (the (N+1)-th message) is displayed on the display 140, a state is formed in which an entirety of the message N (the N-th message) is displayed on the display 140. Accordingly, the determination unit 123 determines whether a part (text head) of the message is displayed, and determines that an entirety of the N-th message is displayed in a case in which at least a part of the (N+1)-th message is displayed on the display 140. The update unit 124, as illustrated in the talk room information table 12', updates the state information of the N-th message (a message having a message ID "m00004") to a "read" state.

The transmitter 112 transmits the identification information (the message ID "m00004") of the message N of which the state information has been updated and the state information updated to the "read" state to the terminal device 100B of the user B through the server 200. In the terminal device 100A of the user A, the receiver 111 receives the identification information of the message N of which the state information has been updated to the "read" state and the state information from the terminal device 100B of the user B. Then, on the display 140 of the terminal device 100B of the user B, as illustrated in FIG. 5C, a "read" mark 21 is displayed in association with the message N. Here, "unread" marks 22 and 23 are displayed in association with messages N+1 and N+2.

Figure 6:
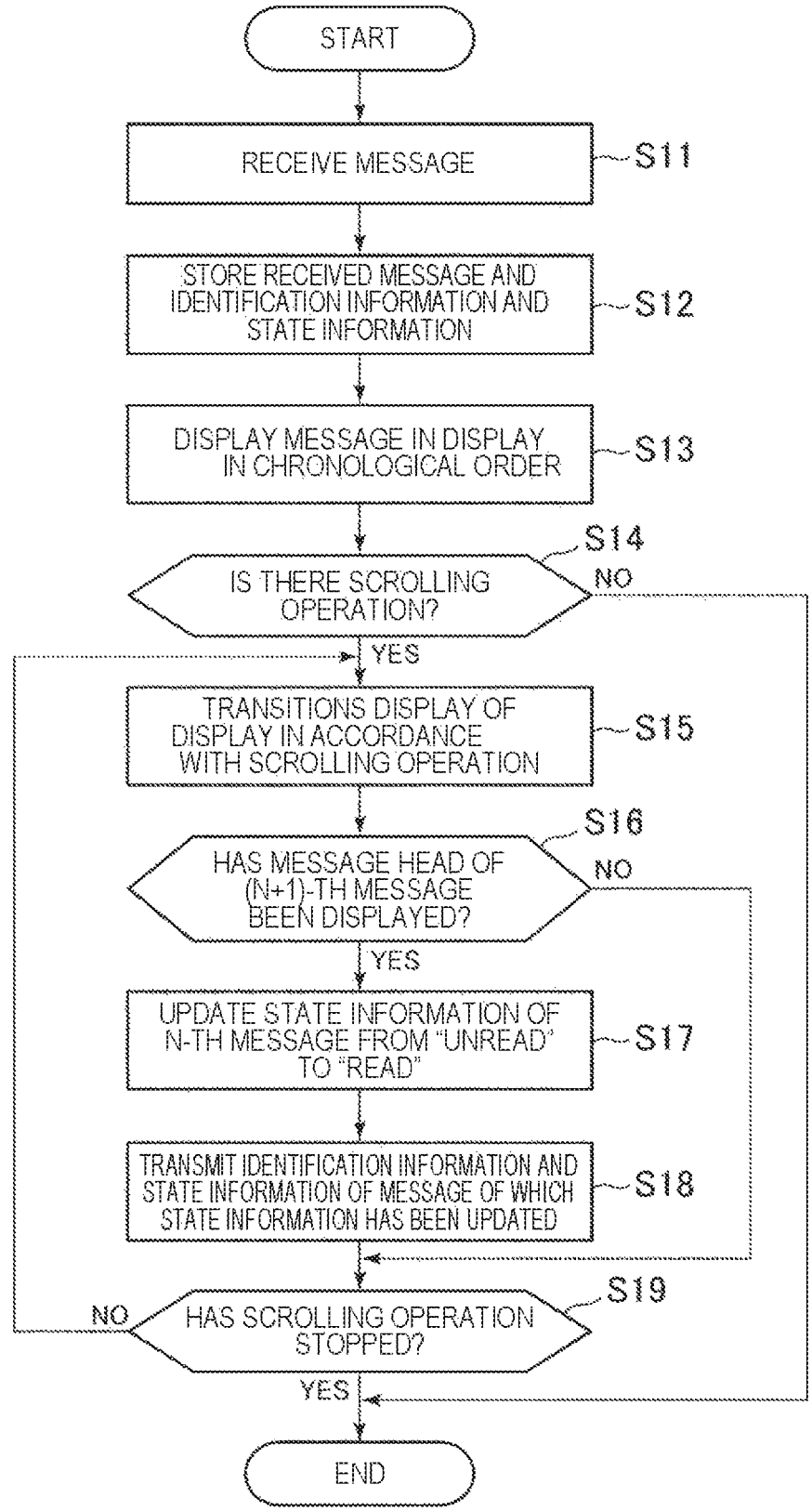
FIG. 6 is a flowchart of a method of controlling a terminal device according to one example embodiment of the present inventive concepts.

A control method according to the first example embodiment described above will be described with reference to FIG. 6. FIG. 6 is a flowchart of the control method described above.

First, the receiver 111 of the terminal device 100A receives a message transmitted from another terminal device 100B (Step S11; reception step). In the received message, identification information assigned from the server is included. The storage 130 stores the received message in association with the identification information and the state information of the message (Step S12; storage step). Then, the display processor 122 outputs display information used for displaying messages on the display 140 in chronological order, thereby displaying the messages on the display 140 (Step S13; output step). Thereafter, the determination unit 123 determines whether or not a scrolling operation (input operation) has been performed on the input unit 160 by a user (Step S14; input step). In a case in which the scrolling operation has been performed through the input unit 160, the display processor 122 transitions the display of the display 140 in accordance with the scrolling operation (Step S15; output step). The determination unit 123 determines whether or not a text head (or a part or a portion) of the (N+1)-th message is displayed on the display 140 (Step S16; determination step). In a case in which it is determined that the text head of the (N+1)-th message is displayed, the update unit 124 updates the state information of the N-th message to "read" from "unread" (Step S17; update step). In a case in which it is determined that the text head of the (N+1)-th message is not displayed, the update unit 124 does not update the state information of the N-th message to "read" from "unread," and proceeds to step S19.

Thereafter, the transmitter 112 transmits the identification information of the message of which the state information has been updated and the updated state information to a terminal device 100B of another user (e.g., user B) that has transmitted the message (Step S18; transmission step). The determination unit 123 determines whether or not the scrolling operation from the user has stopped (Step S19). In a case in which the scrolling operation has not stopped, the process is returned to Step S15, N is updated to N+1, and determination of a following message and update of the state information thereof continues. On the other hand, in a case in which it is determined that the scrolling operation has stopped in Step S19 or in a case in which it is determined that a scrolling operation has not been performed in Step S14, the process ends.

Second Example Embodiment

Next, a second example embodiment of the present inventive concepts will be described. In the first example embodiment, the transmission of the identification information and the like of a message of which the state information has been updated using the transmitter 112 in Step S18 of the flowchart illustrated in FIG. 6 is performed every time when the state information is updated by the update unit 124. In the second example embodiment, the transmission of identification information and the like updated by the update unit 124 is performed when a user's input operation (scrolling operation) stops, in other words, when a transition of the display of the display 140 stops.

Figure 7:
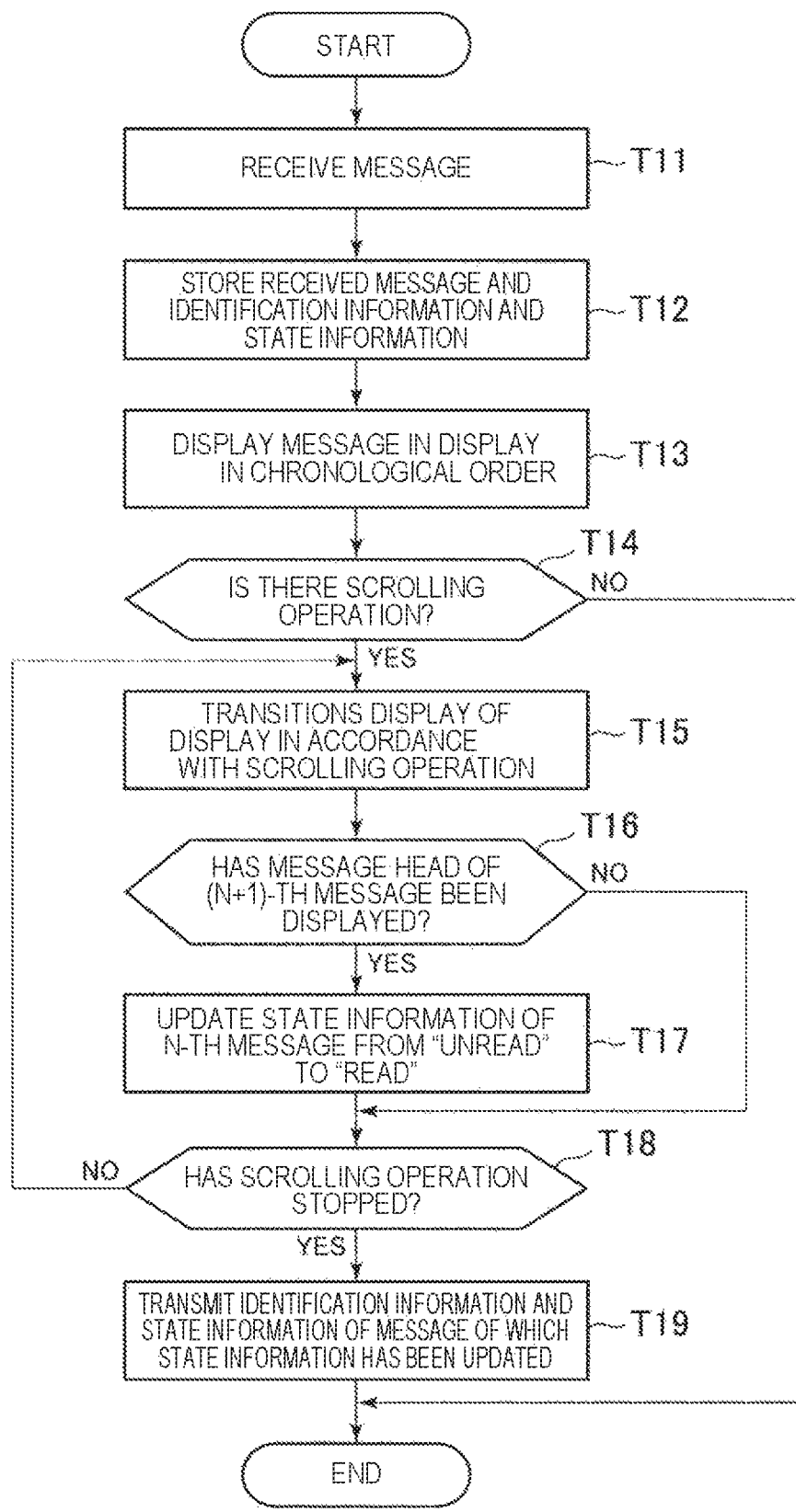
FIG. 7 is a flowchart of a method of controlling a terminal device according to one example embodiment of the present inventive concepts.

FIG. 7 is a flowchart of a control method according to the example second embodiment. In the flowchart illustrated in FIG. 7, Steps T11 to T17 are similar to Steps S11 to S17 in the flowchart illustrated in FIG. 6 described above, and thus description thereof will not be presented. In the second example embodiment, after the state information is updated by the update unit 124 in Step S17, it is determined whether or not a user's input operation has stopped in Step T18. In a case in which it is determined that the input operation has not stopped in Step T18, the process is returned to Step T15, and determination of a following message and update of the state information thereof are continued. On the other hand, in a case in which it is determined that the input operation has stopped in Step T18, identification information of a message of which state information has been updated and the updated state information are transmitted by the transmitter 112 in Step T19. At this time, in a case in which there are a plurality of updated messages, such information is transmitted together from the transmitter 112.

Figure 8:
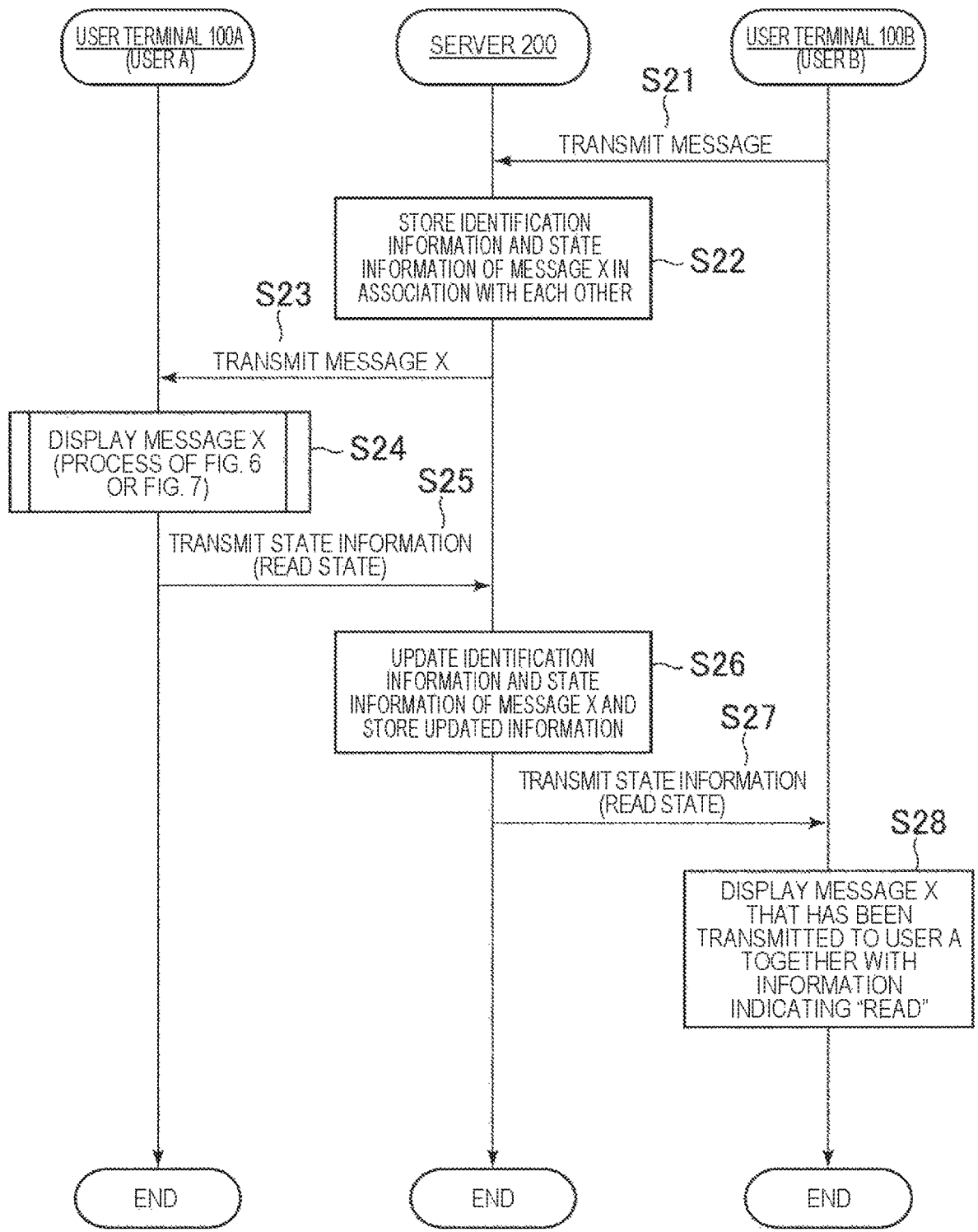
FIG. 8 is a sequence diagram illustrating exchange between terminal devices according to one example embodiment of the present inventive concepts.

Here, exchange of messages between terminal devices described above will be described with reference to a sequence diagram. FIG. 8 is a sequence diagram illustrating one example embodiment of the present inventive concepts. First, a message X having the user A as its destination is transmitted from the terminal device 100B of the user B (Step S21). The server 200 assigns an identification number to the message X transmitted form the terminal device 100B and stores the message X in the storage 230 in association with the identification information and state information of the message X (at this time point, an "unread" state) in the terminal device 100A of the user A (Step S22). Thereafter, the message X is transmitted from the transmitter 212 of the server 200 to the terminal device 100A (Step S23).

In the terminal device 100A, the process according to the flowchart illustrated in FIG. 6 or 7 is performed, and it is determined whether or not the message X has been displayed (Step S24). Then, in a case in which the state information of the message X is updated to a "read" state in the terminal device 100A, the updated state information (read state) is transmitted (Step S25). The server 200 updates the state information of the message X stored in the storage 130 to a "read state" from the "unread" state and stores the updated state information (Step S26). Thereafter, the server 200 transmits the state information (read state) of the message X in the terminal device 100A from the transmitter 212 to the terminal device 100B (Step S27). In the terminal device 100B, when the state information of the message X is received by the receiver 111, the display processor 122 displays the message X transmitted to the user A on the display 140 together with information indicating "read" (Step S28).

As described above, according to the first example embodiment of the present inventive concepts, determination on whether or not a message has been read by a user is performed on the basis of whether or not an entirety of the message has been displayed on the display 140. At this time, whether or not an entirety of the message Nth message has been displayed is determined on the basis of whether or not at least a part of the (N+1)-th message displayed following the N-th message in chronological order has been displayed on the display 140.

Accordingly, it can be reliably determined that the N-th message has been displayed on the display 140. In addition, the state information of a message transmitted by a user is transmitted from a terminal device of another user, and the state (read or unread) of the message transmitted by the user in another terminal device is displayed in the terminal device of the user. At this time, as described above, the state information of a message transmitted from a user to another user is reliably determined to have been read by the another user and, then is transmitted to the terminal device of the user, and accordingly, the user can check with improved precision whether or not another user has read the message.

In addition, according to the second example embodiment, at a timing at which the transition of the display of the display 140 according to a user's input operation is stopped, identification information and the like of the message of which the state information has been updated are transmitted. Accordingly, compared to the first example embodiment in which the state information is transmitted at an updated timing, the second example embodiment uses less processing power of the terminal device.

Third Embodiment

Next, a third example embodiment of the present inventive concepts will be described. In the first example embodiment and the second example embodiment, in a case in which a part of the (N+1)-th message is displayed on the display 140, the state information of the N-th message is updated to a "read" state. In the third example embodiment, the state information of the N-th message may be updated to a "read" state in a case in which a text end of the N-th message is displayed on the display 140. The third embodiment is effective in a case in which there is no following message In addition, in the third example embodiment, the transmission of a message of which the state information is updated and the like may be performed at a timing at which the state information is updated like the first example embodiment or may be performed at a timing at which a transition of the display of the display 140 according to a user's input operation is stopped like the second example embodiment. In addition, the third example embodiment may be combined with the first example embodiment or the second example embodiment.

Fourth Example Embodiment

In the example embodiment described above, a case has been described in which the state information of the message is updated to a read state in a case in which it is determined that an entirety of the message has been displayed on the display 140. In a fourth example embodiment, the state information of a message may be updated to a read state in a case in which an entirety of the message is displayed on the display 140 for a desired (or alternatively predetermined) time.

The determination unit 123 determines whether or not an entirety of the message has been displayed on the display 140. At this time, the determination unit 123 may determine that an entirety of the N-th message has been displayed on the display 140 in a case in which a part of the (N+1)-th message is displayed on the display 140 like the first example embodiment or may determine that the whole N-th message has been displayed on the display 140 in a case in which a text end of the N-th message has been displayed on the display 140. Thereafter, the determination unit 123 determines whether or not the N-th message is displayed on the display 140 until a desired (or alternatively predetermined) time elapses (Condition 1). Alternatively, the determination unit 123 determines whether or not a part of the (N+1)-th message is displayed when a desired (or alternatively predetermined) time elapses after at least a part of the N-th message is displayed (Condition 2). Alternatively, the determination unit 123 may determine whether or not a text end of the N-th message is displayed when a desired (or alternatively predetermined) time elapses after a part of the N-th message is displayed (Condition 3). The desired (or alternatively predetermined) time may be determined on the basis of the number of characters of the message or on the basis of the amount of contents in a case in which the message is a content such as sound data or a moving image data. For example, the desired (or alternatively predetermined) time may be 1.0 second in a case in which the number of characters of the message is 10 and may be 10 seconds in a case in which the number of characters is 100.

In a case in which the determination unit 123 determines that any one of Condition 1 to Condition 3 described above is satisfied, the update unit 124 updates the state information of a message satisfying the condition to a read state. In addition, the transmission of the updated state information using the transmitter 112 may be performed at a timing at which the state information is updated like the first example embodiment or may be performed at a timing at which the transition of the display according to a user's input operation is stopped like the second example embodiment.

According to the fourth example embodiment, in a case in which an entirety of the message is displayed on the display 140 over a desired (or alternatively predetermined) time, the state information is updated to a read state by the update unit 124. Accordingly, for example, the state information is not updated to a read state in a case in which an entirety of the message is displayed on the display 140 only instantly (meaning for a time shorter than the desired or predetermined time) such as a case in which the display screen is transitioned at a relatively high speed in accordance with a user's input operation or the like. Thus, a state in which the user has read a message can be more reliably determined. Accordingly, user convenience is improved.

The effects of the present inventive concepts will be described again. According to some example embodiments of the present inventive concepts, a user can accurately check whether or not a message that he or she has transmitted is read by another user, and the convenience is improved. In addition, a message that has not been read by another user is not presented as "read" to the user, and thus, the other user may easily select to check the message next time by displaying the talk room screen, whereby a high degree of freedom is acquired.

In addition, according to the first example embodiment of the present inventive concepts, the determination of whether or not a message has been read by a user is performed on the basis of whether or not an entirety of the message has been displayed on the display 140. At this time, whether or not an entirety of the message has been displayed is determined on the basis of whether or not at least a part of the (N+1)-th message displayed following the N-th message in chronological order has been displayed on the display 140. Accordingly, it can be reliably determined that the N-th message has been displayed on the display 140.

In addition, according to the second example embodiment of the present inventive concepts, at a timing at which the transition of the display of the display 140 according to a user's input operation is stopped, identification information and the like of the message of which the state information has been updated are transmitted. Accordingly, compared to the first example embodiment in which the state information is transmitted at an updated timing, the second example embodiment uses less processing power of the terminal device.

In addition, according to the third example embodiment of the present inventive concepts, in a case in which a text end of the N-th message is displayed on the display 140, the state information of the N-th message is updated to a "read" state, and accordingly, it is effective in a case in which there is no following message.

In addition, according to the fourth example embodiment of the present inventive concepts, in a case in which the whole message is displayed on the display 140 over a desired (or alternatively predetermined) time, the state information is updated to a read state by the update circuit 124. Accordingly, for example, the state information is not updated to a read state in a case in which an entirety of the message is displayed on the display 140 only instantly (for a time shorter than the desired or predetermined time) such as a case in which the display screen is transitioned at a relatively high speed in accordance with a user's input operation or the like. For this reason, a state in which the user has read a message can be more reliably determined, and accordingly, the convenience is improved.

While some example embodiments of the present inventive concepts have been described, it is apparent that the present inventive concepts are not limited thereto. For example, the desired (or alternatively predetermined) time described above is an example and may be any other numerical value. In addition, the example embodiments described above may be combined together.

For example, in the description presented above, a form in which the user A and the user B exchange messages as one pair has been described. However, the present inventive concepts are not limited to one pair of users and may be applied also to a case in which a group is configured by a plurality of terminal devices, and messages are exchanged among the group. At that time, when a message is transmitted from a certain terminal device (for example, a terminal device 100A) to a group, the message is transmitted to the other terminal devices in the group except for the terminal device 100A through the server 200. In a case in which messages are exchanged among a plurality of terminal devices, for a message transmitted from the terminal device 100A to a plurality of the other terminal devices, the determination process and the update process for the state information described above are performed in each of the other terminals. Then, updated state information is transmitted from each of the other terminal devices to the terminal device 100A. In the terminal device 100A, in accordance with the number of times of reception of read information, for example, the number of times of reception of the read information may be displayed in "read" displayed together with the message.

In addition, there are a case in which the display of the display is transitioned at a relatively slow speed and a case in which the display is transitioned at a relatively high speed in accordance with a user' scrolling operation. For example, the former is in the case of a scrolling operation performed by a user having a finger not separated away from the input unit 160, and the latter is in the case of a scrolling operation performed by a user having a finger separated away from the input unit 160. In the former case of the scrolling operation in which the display is transitioned at a relatively slow speed, like the first example of the flowchart illustrated in FIG. 6, it is desirable that communication with the server is performed at a time point at which the state information becomes "read". On the other hand, in the latter case of the scrolling operation in which the display is transitioned at a relatively high speed, like the second example of the flowchart illustrated in FIG. 7, it is preferable that communication with the server is performed at a time point at which the transition of the display is stopped. The determination of one of the both scrolling operations may be performed by determining whether or not a user's finger or an indicator such as a stylus or the like is in contact with the input unit 140.

In addition, in the description present above, a form in which a "read" state or an "unread" state is determined as the state information has been described. However, an "open" state may be determined as the state information. The "open" state is a state indicating that a user is in the middle of reading a message and represents a state in which at least a part of the message is displayed on the display 140. This can be embodied by the update unit 124 updating the state information from an "unread" state to an "open" state in a case in which the determination unit 123 determines that at least a part of the message has been displayed on the display 140. Also this "open" state is transmitted from the transmitter 112 to another terminal device, and, for example, a display of "open" may be displayed on the display 140 of the other terminal device in association with the message.

Figure 10:
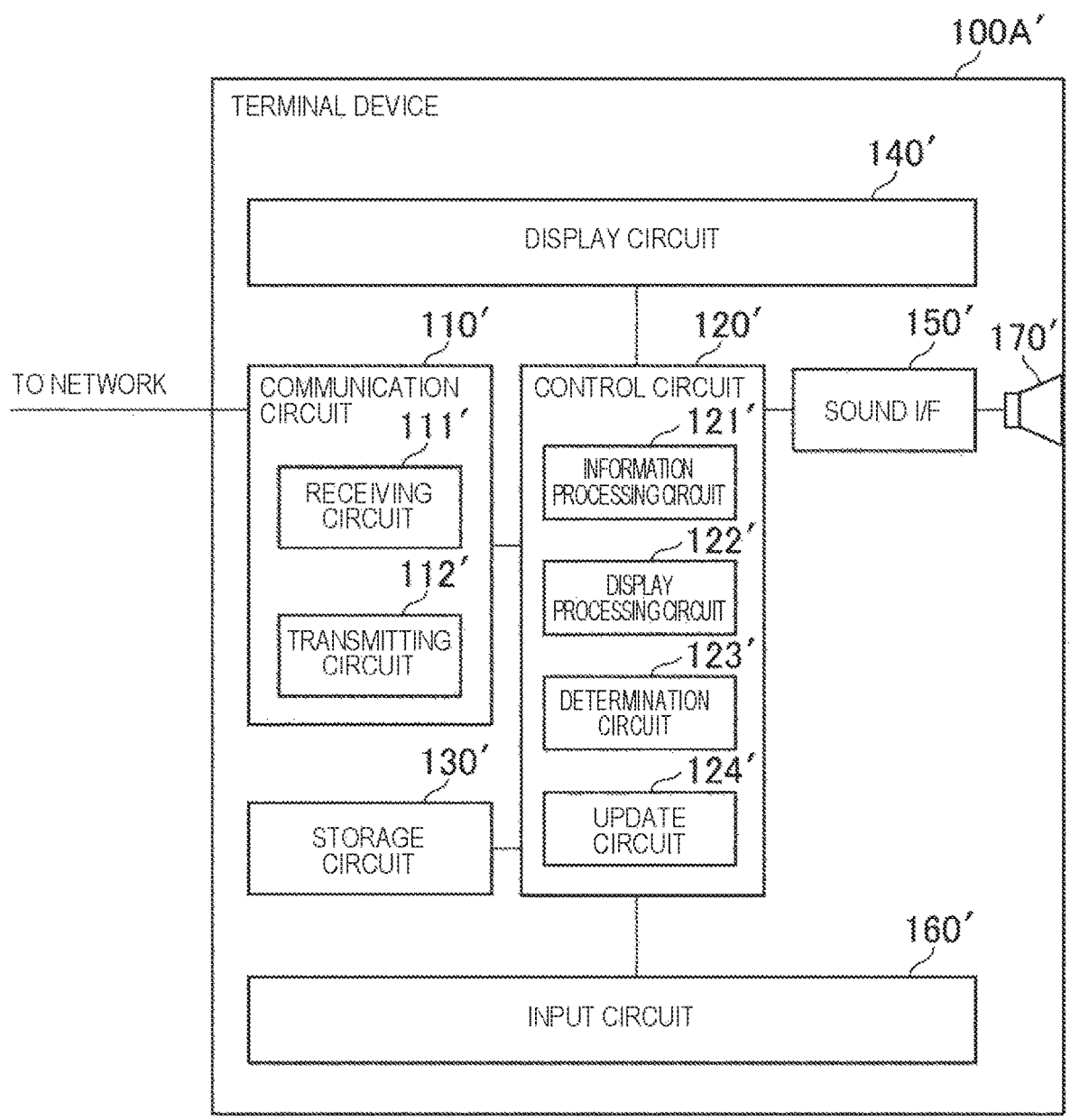
FIG. 10 is a block diagram of a terminal device according to another example embodiment of the present inventive concepts.

FIG. 10 is a block diagram of a terminal device 100A' according to another example embodiment of the present inventive concepts. As illustrated in FIG. 10, the terminal device 100A' includes a communication circuit 110', a control circuit 120', a storage circuit 130', a display circuit 140', a sound interface (I/F) 150', an input circuit 160', and a speaker 170'.

The communication circuit 110' may include a receiving circuit 111' and a transmitting circuit 112' and execute communication with the server.

The control circuit 120' may be a processor that has a function of controlling each unit of the terminal device 100A'. The control circuit 120' may include an information processing circuit 121', a display processing circuit 122', a determination circuit 123', and an update circuit 124'.

Detailed functions of the individual circuits or elements of the terminal device 100A' are the same as or substantially similar to the functions of the corresponding elements of the terminal device 100A illustrated in FIG. 2, respectively.

Figure 11:
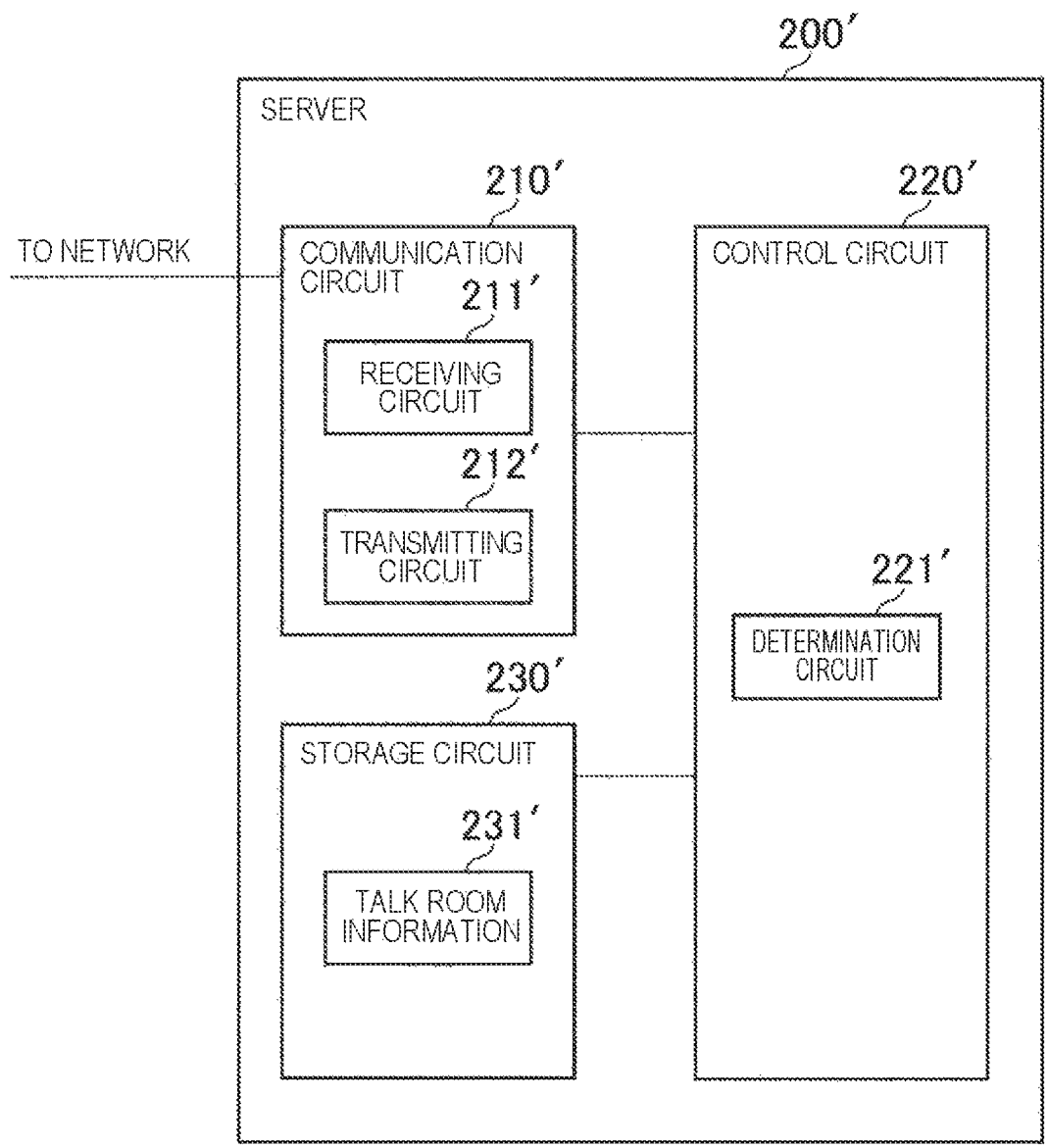
FIG. 11 is a block diagram of a server according to another example embodiment of the present inventive concepts.

FIG. 11 is a block diagram of a server 200' according to another example embodiment of the present inventive concepts. As illustrated in FIG. 11, the server 200' includes a communication circuit 210', a control circuit 220', and a storage circuit 230'.

The communication circuit 210 may include a receiving circuit 211' and a transmitting circuit 212' and execute communication (transmission/reception of various kinds of data and messages) with terminal devices through network in accordance with an instruction from the control circuit 220'.

The control circuit 220' may be a processor that control each unit of the server 200'. The control circuit 220' may include a determination circuit 221'. The determination circuit 221' may perform various determination processes. For example, the determination circuit 221' may determine a terminal device to which state information is to be transmitted on the basis of the identification information and state information of a message, which are transmitted by the terminal device, received by the receiving circuit 211'.

The storage circuit 230' is typically embodied by various recording media such as an HDD, an SSD, a flash memory, and the like and stores various programs and various kinds of data that are desired for operating the server 200'. The storage circuit 230' may store information (e.g., talk room information 231') relating to a talk room in which messages are exchanged between users (talk room information). The storage 230 may be embodied by a RAM and include a memory functioning as a work memory of the control circuit 220'. The memory may store temporary data. In addition, various kinds of data to be stored in the storage circuit 230' may be temporarily stored in a memory and then stored in the storage circuit 230'.

Detailed functions of the individual circuits of the server 200' are the same as or substantially similar to the functions of the corresponding elements of the server 200 illustrated in FIG. 2, respectively.

In addition, the terminal devices 100A and 100B are not limited to smartphones. The terminal devices 100A and 100B may be any other devices as long as the devices are information processing devices capable of realizing the functions described in the example embodiments described above. For example, the terminal devices 100A and 100B may be a notebook PCs, smartphones, tablet terminals, mobile phones, wearable terminals (including a glasses type, a wrist watch type, and the like) or desktop personal computers (PCs).

Each of the functional units of the terminal devices 100A and 100B and the server 200 may be embodied using a logic circuit (hardware) or a dedicated circuit formed in an integrated circuit (an integrated circuit (IC) chip or a large scale integration (LSI)) or the like and may be embodied using software using a central processing unit (CPU). In addition, each functional unit may be embodied using one or a plurality of integrated circuits, and the functions of a plurality of functional units may be embodied using one integrated circuit. The LSI may be called a VLSI, a super LSI, an ultra LSI, or the like depending on the degree of integration.

In a case in which each functional unit of the terminal devices 100A and 100B and the server 200 is embodied using hardware, software, or a combination of both, the server 200 or each of the terminal devices 100A and 100B includes a CPU executing commands of a program that is software realizing each function, a read only memory (ROM) or a storage device in which the program and various kinds of data are recorded in a computer (or CPU)-readable manner (these will be referred to as "recording media"), a random access memory (RAM) expanding the program, and the like. Then, the computer (or the CPU) reads the program from the recording media and executes the program, whereby the present inventive concepts are achieved. As the recording media described above, media of a non-transient type, for example, a tape, a disk, a card, a semiconductor memory, a programmable logic circuit, and the like may be used. In addition, the software program described above may be supplied to the computer through an arbitrary transmission medium (a communication network, a broadcast wave, or the like) capable of transmitting the software program. The present inventive concepts may be embodied in the form of data signals embedded in a carrier wave in which the software program is implemented through electronic transmission. For example, a non-transitory computer readable recording medium according to one example embodiment of the present inventive concepts storing a program that embodies a reception function, a storage function, a transmission function, an output function, an input function, a determination function, an update function, and a display function in the terminal devices 100A and 100B. The reception function, the storage function, the transmission function, the output function, the input function, the determination function, the update function, and the display function described above may be respectively embodied by the receiver 111, the storage 130, the transmitter 112, the display processor 122, the input unit 160, the determination unit 123, the update unit 124, and the display 140 described above. In addition, each of the terminal device 100A and the server 200 may be respectively embodied also using the circuit configurations illustrated in FIGS. 10 and 11.

In addition, the program described above, for example, may be embedded using a script language such as ActionScript or JavaScript (registered trademark), an object-oriented programming language such as Objective-C or Java (registered trademark), a markup language such as HTML5, or the like.

While the present inventive concepts have been described on the basis of the drawings and the foregoing example embodiments, it should be noted that a person skilled in the art may easily make various alterations and modifications on the basis of the present disclosure. Thus, it should be noted that such alterations and modifications belong to the scope of the present inventive concepts. For example, functions and the like included in each means, each step, or the like may be rearranged so long as there is no logical contradiction, and a plurality of means or steps may be combined into one or divided into parts. In addition, the components illustrated in the example embodiments described above may be appropriately combined.

What is claimed is:

1. A method of controlling a terminal device, the method comprising:
   receiving a first message transmitted from a first terminal device;
   storing the first message received in association with first identification information and first state information of the first message in a storage;
   displaying messages from a plurality of terminal devices and stored in the storage together with respective state information of the messages from various ones of the plurality of terminal devices on a display, the messages including the first message, the respective state information including the first state information, the respective state information each including information indicating at least one of a read state or an unread state of a respective one of the messages;
   transitioning the display from one state to another state in accordance with a scrolling operation for the display from a user;
   determining whether or not an entirety of the first message is displayed on the display as a result of the transitioning on the display according to the scrolling operation;
   updating the first state information of the first message as the read state indicating a state in which the first message has been read in response to a result of the determining indicating that the entirety of the first message is displayed on the display; and
   transmitting the first message, the first identification information of the first message of which the first state information has been updated, and the first state information associated with the first message to the first terminal device,
   wherein the displaying displays the messages on the display in chronological order,
   the determining determines that the entirety of the first message has been displayed on the display as an N-th message in response to at least a part of an (N+1)-th message, from among the messages, displayed on the display as the result of the transitioning on the display according to the scrolling operation, and
   the updating updates the first state information of the first message as the N-th message to the read state in response to the result of the determining indicating that at least a part of the (N+1)-th message displayed on the display.

2. The method of controlling a terminal device according to claim 1, wherein the transmitting is performed at a timing at which the transitioning of the display according to the scrolling operation from the user is stopped.

3. The method of claim 1, wherein the transmitting is performed at a timing at which the first state information of the first message is updated to the read state in the updating.

4. The method of claim 1, wherein the transmitting is performed in response to the scrolling operation for the display being stopped.

5. The method of claim 1, wherein
   the determining determines that the entirety of the first message has been displayed on the display as the N-th message in response to a text end of the N-th message displayed on the display as the result of the transitioning on the display according to the scrolling operation, and
   the updating updates the first state information of the first message as the N-th message to the read state in response to the result of the determining indicating that the text end of the N-th message is displayed on the display.

6. The method of claim 5, wherein the updating updates the first state information of the first message as the N-th message to the read state in response to at least a part of the (N+1)-th message being displayed after at least a part of the N-th message is displayed for a time.

7. The method of claim 1, wherein the updating updates the state information of the N-th message to the read state in response to a text end of the N-th message is displayed after at least a part of the N-th message is displayed for a time.

8. A terminal device comprising:
   a memory configured to store computer-readable instructions; and
   one or more processors configured to execute the computer-readable instructions such that the one or more processors are configured to,
   receive a first message transmitted from a first terminal device,
   store the received first message in association with first identification information and first state information of the first message in a storage,
   display messages from a plurality of terminal devices and stored in the storage together with respective state information of the messages on a display, the messages including the first message, the respective state information including the first state information, the respective state information each including information indicating at least one of a read state or an unread state of a respective one of the messages,
   transition the display from one state to another state in accordance with a scrolling operation for the display from a user,
   determine whether or not an entirety of the first message is displayed on the display as a result of the transitioning on the display according to the scrolling operation,
   update the first state information of the first message as the read state indicating a state in which the first message has been read in response to a result of the determination indicating that the entirety of the first message is displayed on the display, and
   transmit the first identification information of the first message of which the first state information has been updated, the first state information associated with the first message, and the first message to the first terminal device,
   wherein the one or more processors are further configured to,
     display the messages on the display in chronological order,
     determine whether or not the entirety of the first message is displayed on the display as an N-th message in response to at least a part of an (N+1)-th message, from among the messages, displayed on the display as the result of the transitioning on the display according to the scrolling operation, and
     update the first state information of the first message as the N-th message to the read state in response to the result of the determining indicating that at least a part of the (N+1)-th message displayed on the display.

9. A non-transitory computer readable recording medium storing a program that, when executed by a processor, causes the processor to perform a method, the method comprising:
- receiving a first message transmitted from a first terminal device;
- storing the received first message in association with first identification information and first state information of the first message in a storage;
- displaying messages from a plurality of terminal devices and stored in the storage together with respective state information of the messages on a display, the messages including the first message, the respective state information including the first state information, the respective state information each including information indicating at least one of a read state or an unread state of a respective one of the messages;
- transitioning the display from one state to another state in accordance with a scrolling operation for the display from a user;
- determining whether or not an entirety of the first message is displayed on the display as a result of the transitioning on the display according to the scrolling operation;
- updating the first state information of the first message as the read state indicating a state in which the first message has been read in response to a result of the determining indicating that the entirety of the first message is displayed on the display; and
- transmitting the first identification information of the first message of which the first state information has been updated, the first state information associated with the first message, and the first message to the first terminal device,
- wherein the displaying displays the messages on the display in chronological order,
- the determining determines that the entirety of the first message has been displayed on the display as an N-th message in response to at least a part of an (N+1)-th message, from among the messages, displayed on the display as the result of the transitioning on the display according to the scrolling operation, and
- the updating updates the first state information of the first message as the N-th message to the read state in response to the result of the determining indicating that at least a part of the (N+1)-th message displayed on the display.

10. The method of controlling a terminal device according to claim 1, wherein the storing comprises:
- assigning, by a server, the first identification information to the first message, and
- storing in the storage associated with the server the first message in association with the first identification information and the first state information of the first message.

11. The method of controlling a terminal device according to claim 1, wherein the determining determines that the entirety of the first message is displayed on the display
- in response to a part of the (N+1)-th message being displayed on the display after an elapse of a threshold time after at least a part of the first message as the N-th message having been displayed on the display, or
- in response to an elapse of the threshold time after displaying at least a part of the first message.

12. The method of controlling a terminal device according to claim 11, further comprising:
- determining the threshold time based on a number of characters in the first message or an amount of contents in the first message.

* * * * *